(No Model.)
G. W. SCOLLAY.
MANUFACTURE OF PIGMENTS.
No. 471,147. Patented Mar. 22, 1892.
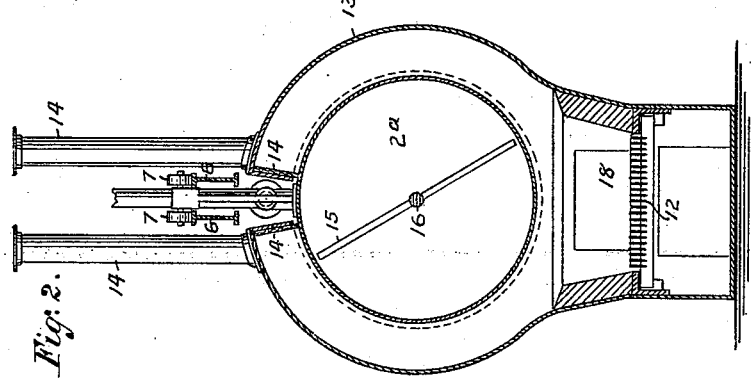
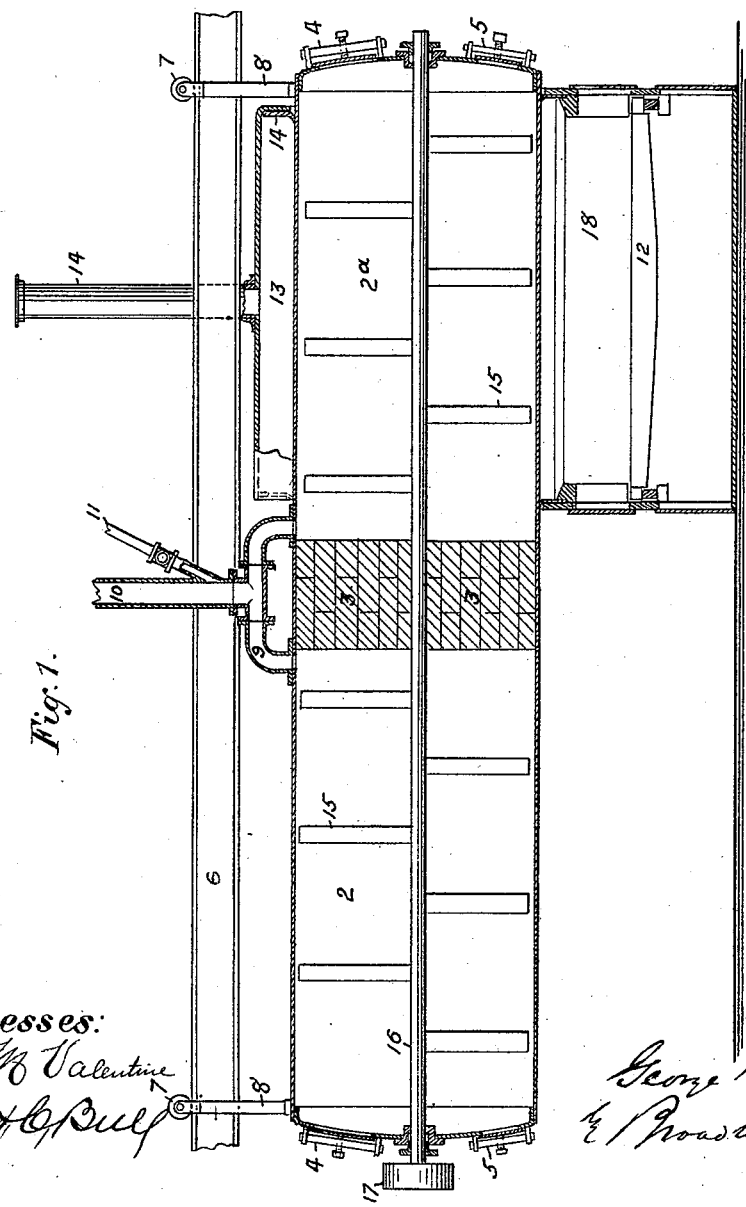
Witnesses:
Wm M Valentine
Chas G Bull
Inventor:
George W. Scollay
by Broadnax & Bull
Attys.

UNITED STATES PATENT OFFICE.

GEORGE W. SCOLLAY, OF NEW YORK, N. Y.

MANUFACTURE OF PIGMENTS.

SPECIFICATION forming part of Letters Patent No. 471,147, dated March 22, 1892.

Application filed February 20, 1891. Serial No. 382,211. (No specimens.)

*To all whom it may concern:*

Be it known that I, GEORGE W. SCOLLAY, a citizen of the United States, residing in the city, county, and State of New York, have invented certain new and useful Improvements in the Manufacture of Pigments, of which the following is a specification.

The principal object of my present invention is to change or improve the color of iron oxides and ores, hematite, burned yellow and other ochers, and all analogous materials.

The following is a description of the manner in which I now prefer to work my present invention when treating what is commonly known as "blue billy"—a substance which remains in the retort when iron pyrites are decomposed in sulphuric-acid works. This description will enable others skilled in the art to apply my invention not only to the treatment of blue billy, but also to the treatment of other analogous materials, and not only by the use of the materials and in the manner described, but also by the use of equivalent materials, which will accomplish substantially the same result.

In the accompanying drawings, Figure 1 is a longitudinal section through retorts in which my invention may be worked in its preferred form, and Fig. 2 is a cross-section through the same.

The following is a description of the way in which I now prefer to convert blue billy into a superior red pigment. To convert this material into ferric oxide, which is a commercial red pigment, it is necessary to combine oxygen with it. While it cannot be made to take up oxygen directly under ordinary circumstances, it can be made to take up the requisite amount of oxygen to convert it into a ferric oxide when in the presence of oxygen in the nascent state. The oxygen so taken up may be appropriated entirely from the materials used, or it may be ultimately appropriated from the air. By preference I mix with the blue billy after it has been reduced to a fine powder sulphate of ammonia and raise the temperature of the vessel to a moderate heat—say from 500° to 600° Fahrenheit. By this treatment the sulphate of ammonia is decomposed. The ammonia driven off is conducted out of the retort and may be collected in any suitable vessel. Sulphate of ferric oxide remains in the retort. By increasing the temperature now to a low-red heat the sulphate of the ferric and ferrous oxide is decomposed, and Nordhausen or fuming sulphuric acid passes out of the retort and may be collected in any suitable vessel. Ferric oxide, which is a valuable red pigment, remains in the retort. In this operation the iron is first converted into a salt, by the decomposition of which the red pigment is formed.

Blue billy may be treated with any substance containing oxygen from which it can appropriate the required oxygen necessary to convert it into a red pigment. In order to obtain, however, a pure article or a pure color it is necessary that the substance used in the treatment should either leave no residue in the retort when the treatment is completed, or the residue left must be of a color which will not injuriously dilute or affect the color, unless, of course, such modified color be preferred. When sulphate of ammonia is used, a moderate heat drives off the ammonia and a higher heat drives off Nordhausen acid, leaving pure ferric oxide behind. The blue billy may also be treated with other substances containing oxygen. For example, I have already obtained more or less satisfactory results by the use of the sulphate of ferrous oxide, the sulphate of ferric oxide, oxalic acid, and sulphuric acid. However, I have obtained the best results by using a salt. My experiments have led me to believe that when by the influence of heat in the presence of blue billy the elements of the salt are separated the acid then liberated is in a more active and efficient condition than would be the same acid if introduced into the charge in the form of an acid, while the material of the retort is less injuriously affected, because the acid combines with the iron oxide as fast as it is liberated. Besides, as heat is an important element in converting the oxide of iron into a salt, the use of a salt which does not decompose, except at a temperature at which the acid will readily combine with the iron oxide, promotes economy and secures improved results.

Of the several materials I have employed I prefer at present to use the sulphate of ammonia, because I have thereby obtained the most satisfactory results with the least trouble and expense, while, like other treating agents which convert the blue billy into sulphate of iron, the acid element after it has parted with some of its oxygen to the iron may be made to acquire an equivalent of oxygen from the air, and hence may be, as will be hereinafter more particularly described, used over and over again, so that theoretically an indefinitely small quantity of sulphate of ammonia is capable of converting an indefinitely large amount of blue billy into a red pigment by ultimately acting merely as a vehicle to carry oxygen from the air to the iron to reinforce and change its color.

I will now describe the second feature of my invention, which relates more particularly to the reconversion of the elements disengaged during the processes above described, in which sulphate of iron is formed back again into the treating material.

The ammonia first discharged from the retort may be collected in a vessel, in which the Nordhausen acid is also subsequently collected, or, as above explained, they may be collected in separate vessels. If tetroxide of nitrogen or any higher oxide of nitrogen be present in the retort containing Nordhausen acid with air and steam, a part of its oxygen will be given up to and go to convert the Nordhausen acid into sulphuric acid, reducing the nitrogen tetroxide into nitrogen trioxide, which will take an equivalent of oxygen from the air, being thereby raised again to nitrogen tetroxide, and so on until all the work of conversion is accomplished. In this case the nitrogen trioxide or nitrogen tetroxide act merely as vehicles or carriers of oxygen from the air to the sulphurous acid. The sulphuric acid thus formed will, if ammonia be present, combine with the ammonia, forming sulphate of ammonia. In order to obtain the nitrogen tetroxide or higher oxide of nitrogen necessary for this purpose nitrate of lead or nitrate of iron may be employed and may be decomposed by heat in any suitable vessel, forming nitrogen trioxide and oxygen. Other materials which yield the nitrogen tetroxide or other higher forms of nitrogen oxide or other equivalent carrier may be employed for the same purpose.

The manner in which I at present prefer to work my invention when treating blue billy may be thus described: I first introduce into a retort with the blue billy and mix with it twenty-five per cent. of sulphate of ammonia and one per cent. of nitrate of lead or nitrate of iron. The vessel is now gently heated until ammoniacal gas ceases to be driven off. This gas is discharged into a retort maintained cool, containing another charge of blue billy, ground and ready to be treated. When the evolution of the ammoniacal gas ceases, I increase the heat, bringing it up to a low red, and permit the Nordhausen acid with the decomposed nitrate of lead or nitrate of iron also to pass into the retort containing the blue billy. The conversion of the blue billy in the first-mentioned retort into Venetian red is now complete. It is removed and a new charge introduced into its place. The blue billy in the other retort which is maintained cool is kept preferably in a state of constant agitation. Into this second retort air and steam are admitted, and sulphate of ammonia is formed and intimately mixed with the blue billy. Heat is now applied to this retort, first a low heat and subsequently a high heat, as before described, and this charge of blue billy is also converted into a red pigment. The distillates in this case are led back into the first retort, where they are mixed with a new charge. A convenient apparatus for carrying on this operation may consist of two separate chambers connected by a suitable duct and carried on wheels running on a track over a furnace, so that they may be alternately heated, and, if desired, provided with water-jackets, so that the temperature of one may be quickly reduced and kept cool while the other is heated. In such an apparatus after the blue billy, sulphate of ammonia, and nitrate lead or nitrate of iron have been introduced into one chamber and a charge of blue billy in the other it is only necessary to heat the first until conversion is complete, when the apparatus may be slid forward, carrying one chamber away from the fire and bringing the other chamber over it, when the charge from the first chamber may be removed and a new charge introduced and the action repeated again and again.

The accompanying drawings show one of the very many forms of apparatus which may be employed in working my invention on a commercial scale; but it will be understood that my invention is not limited to the construction of the retort or the manner of operating the same. The device shown is only intended to illustrate one form of double retort in which the invention may be continuously operated, as above described.

Referring to said drawings, 2 $2^a$ are retorts made of tubular form, as shown in Fig. 2. These retorts are set end to end with a separating-partition 3 of fire-brick or other suitable material. Each of the retorts 2 and $2^a$ is provided with suitable doors 4 4 and 5 5.

6 6 are tracks.

7 7 are rollers running on said tracks journaled in brackets 8 8, attached to the retorts.

9 is a duct, through which the retorts 2 and $2^a$ communicate.

10 and 11 are ducts entering the duct 9.

12 are the grate-bars of the furnace under the retorts.

13 is a split drum surrounding the retort, except at the top where the brackets 8 8 are attached. This drum is provided with chimneys 14 14. The drum 13 but loosely fits the outside of the retort, and any suitable packing, as 14, may be employed to preserve an air-tight joint.

15 15 are paddles carried on a shaft 16, provided with pulley 17.

The operation of the device may be thus described: Assume that a charge of blue billy mixed with the treating material or materials be in retort 2ª, and that another charge of blue billy be in position in the retort 2. The retort 2ª by means of the furnace 18 is heated to the required temperature. As the drum 13 extends around the sides of this retort, the heat will be evenly applied and the temperature may be readily regulated. The gases driven off during the heating process are carried through the duct 9 into the chamber 2. Air is continuously introduced through the duct 10 and steam through the duct 11, which mingle with the gases driven off during the treatment of the charge in the retort 2ª and pass therewith into the retort 2, which is maintained at a lower temperature. Here these elements combine and are mixed with the blue billy contained in retort 2. After the blue billy in the retort 2ª has been entirely converted, the double retort is, by any suitable means, slid forward on the tracks 6 6, carrying the retort 2ª away from the fire and the retort 2 over the fire. The pigment is removed from the retort 2ª and the fresh charge of blue billy introduced, and the operation described repeated. During the treatment of the material the shaft 16 by any suitable source of power may be kept in revolution, so that the paddles 15 15 shall agitate the material while it is being treated.

I desire to remark that in the foregoing specification I have described the actions and reactions and the changes effected as I now understand them; but it is to be understood that I do not limit my invention to a process or processes in which the reactions or changes described take place, as the effects produced may be due to other causes not now understood by me. This specification will be read, therefore, merely as a statement of what I now understand to be the operation involved. Furthermore, I have here incidentally referred to a few of the modifications which may be adopted in practicing my invention and a few of the materials to which it is applicable and a few of the materials which may be employed as agents therein; but I desire it to be distinctly understood that mention by me of a few modifications or of a few equivalents is in no way intended to exclude others not referred to, but which are within the spirit and scope of my invention, the object of this specification being to instruct persons skilled in the art to practice my invention in the way at present preferred by me and to enable them to understand its nature.

Many of the details described are not essential to my several inventions separately considered. All this will be indicated in the concluding claims, where the omission of elements above described is intended to be a formal declaration of the fact that such elements are not essential to the inventions severally covered.

Having thus described my invention as I now understand it and the form in which I prefer to practice it, what I claim, and desire to secure by Letters Patent, is—

1. The method of making pigments, consisting in subjecting the iron oxide to the action of a salt, the acid element of which in the presence of heat sufficient to decompose said salt will combine with the iron oxide, then subjecting the same to heat, by means of which the acid liberated combines with the iron oxide to form a corresponding salt of iron, and then decomposing said salt of iron by heat.

2. The method of making pigments, consisting in subjecting iron oxide to the action of sulphate of ammonia and heat.

3. The method of making pigments, consisting in subjecting iron oxide in the presence of heat to the action of a volatile substance containing oxygen, such as sulphuric acid combined or uncombined, which oxygen is in the presence of heat liberated and appropriated by the iron oxide, and of conducting the distillate into another chamber containing oxygen and a carrier of oxygen, such as nitrogen tetroxide, where it acquires the oxygen given up to the iron oxide in improving or changing its color.

4. The method of making pigments, consisting in converting iron oxide into the sulphate of iron, decomposing said salt, and combining the acid driven off with air and water in the presence of a vehicle of oxygen, such as nitrogen tetroxide, to form sulphuric acid.

5. The method of making pigments, consisting in converting iron oxide into sulphate of iron, decomposing said salt, and combining the acid driven off with air and water in the presence of a vehicle of oxygen, such as nitrogen tetroxide, in a retort containing a charge of oxide of iron to be converted into a pigment, as herein described.

6. The method of making pigments, consisting in heating a mixture of iron oxide and sulphate of ammonia, decomposing the sulphate of iron thus formed, and combining the acid driven off with air and water in the presence of a vehicle of oxygen, such as nitrogen tetroxide, and therewith treating a new charge of iron oxide to be converted into a pigment.

7. The method of making pigments, consisting in heating a mixture of iron oxide and sulphate of ammonia, decomposing the sulphate of iron thus formed, and combining the acid and ammonia driven off with air and water in the presence of a vehicle of oxygen, such as nitrogen tetroxide, and therewith treating a new charge of iron oxide to be converted into a pigment.

GEORGE W. SCOLLAY.

Witnesses:
J. EDGAR BULL,
WM. M. VALENTINE.